(12) United States Patent
Bechler

(10) Patent No.: US 11,306,851 B2
(45) Date of Patent: Apr. 19, 2022

(54) SEALING SLEEVE FOR PIPE OFFSETS

(71) Applicant: Uhrig Kanaltechnik GmbH, Geisingen (DE)

(72) Inventor: Christian Bechler, Tengen (DE)

(73) Assignee: Uhrig Kanaltechnik GmbH, Geisingen (DE)

( * ) Notice: Subject to any disclaimer, the term of this patent is extended or adjusted under 35 U.S.C. 154(b) by 289 days.

(21) Appl. No.: 16/303,377

(22) PCT Filed: May 23, 2017

(86) PCT No.: PCT/EP2017/000618
§ 371 (c)(1),
(2) Date: Nov. 20, 2018

(87) PCT Pub. No.: WO2017/202493
PCT Pub. Date: Nov. 30, 2017

(65) Prior Publication Data
US 2020/0318765 A1 Oct. 8, 2020

(30) Foreign Application Priority Data

May 25, 2016 (DE) .......................... 102016006561.3

(51) Int. Cl.
*F16L 25/14* (2006.01)
*F16L 13/14* (2006.01)

(52) U.S. Cl.
CPC ............. *F16L 25/14* (2013.01); *F16L 13/147* (2013.01)

(58) Field of Classification Search
CPC ..... F16L 55/162; F16L 55/163; F16L 55/165; F16L 13/0227

USPC ......................................................... 285/397
See application file for complete search history.

(56) References Cited

U.S. PATENT DOCUMENTS

| | | | | |
|---|---|---|---|---|
| 2,517,626 A | * | 8/1950 | Berg | F28F 11/04 138/97 |
| 3,642,032 A | * | 2/1972 | Cook | F16L 55/163 138/97 |
| 4,303,103 A | * | 12/1981 | Marks | F16L 21/022 138/97 |
| 4,346,922 A | * | 8/1982 | Ohtsuga | F16L 55/163 138/97 |
| 4,685,704 A | * | 8/1987 | Kolar | E03F 3/04 285/109 |
| 5,035,539 A | * | 7/1991 | Kawafuji | F16L 55/163 405/184.2 |

(Continued)

FOREIGN PATENT DOCUMENTS

| | | | | |
|---|---|---|---|---|
| AT | 000438 U1 | 10/1995 | | |
| CN | 1659399 A | * | 8/2005 | .............. F16L 25/14 |

(Continued)

*Primary Examiner* — Matthew Troutman
*Assistant Examiner* — Alexander T Rufrano
(74) *Attorney, Agent, or Firm* — Richard M. Goldberg

(57) ABSTRACT

A sealing inner sleeve for inserting into pipes, includes two frustoconical or substantially cylindrically bent-round sleeves formed of steel sheets, wherein the free ends of the steel sheets of the sleeves overlap in their circumferential directions and an arresting device is arranged in each of these overlapping regions and wherein the two sleeves are arranged at a distance from one another in a deformable jacket tube.

3 Claims, 7 Drawing Sheets

(56) References Cited

U.S. PATENT DOCUMENTS

| | | | | |
|---|---|---|---|---|
| 5,096,332 | A | * | 3/1992 | Kawafuji .......... F16L 55/1645 |
| | | | | 405/157 |
| 5,351,720 | A | * | 10/1994 | Maimets .............. F16L 55/163 |
| | | | | 138/98 |
| 5,423,630 | A | * | 6/1995 | Imoto .................. F16L 55/163 |
| | | | | 138/97 |
| 5,738,359 | A | | 4/1998 | Gundy |
| 5,855,729 | A | * | 1/1999 | Kiest, Jr. ................ B29C 63/36 |
| | | | | 156/423 |
| 6,138,718 | A | | 10/2000 | Maimets |
| 6,692,039 | B2 | * | 2/2004 | Topf, Jr. ............... F16L 21/002 |
| | | | | 138/97 |

FOREIGN PATENT DOCUMENTS

| | | | | |
|---|---|---|---|---|
| CN | 101432499 A | | 5/2009 | |
| CN | 104154362 A | | 11/2014 | |
| CN | 204286938 U | | 4/2015 | |
| DE | 19544877 C1 | | 10/1996 | |
| DE | 10017711 B4 | | 10/2001 | |
| DE | 102010015483 A1 | | 10/2010 | |
| GB | 2038976 A | * | 7/1980 | ............. F16L 21/02 |
| WO | 93/18334 A1 | | 9/1993 | |
| WO | 2013/142757 A1 | | 9/2013 | |

\* cited by examiner

SEALING SLEEVE FOR PIPE OFFSETS

BACKGROUND OF THE INVENTION

The invention relates to a sealing inner sleeve for inserting into pipes.

By using sealing inner sleeves, existing pipelines can be renovated, in particular, leaks in underground sewage water pipelines can be repaired without any excavation work.

It is known to seal leaks in pipes from the interior of the pipe. To this end, sleeves are used which are bent together in an overlapped manner, have special sealing elements, are made of resilient, corrosion-resistant steel sheets and are inserted into the pipe to be sealed until the leak is reached. There, they are expanded by means of a pneumatically or hydraulically inflatable cushion or packer or by means of a mechanical mounting device, until they closely abut to the inner wall of the pipe as a result of the compression of the duroplastic sealing elements.

An arresting device holds the sealing inner sleeve in the expanded position. In DE 195 44 877 C1 such an arresting device connected to the steel sheet is disclosed.

The sealing sleeves as known up to now are less suitable for being successfully used in offsets of pipes. A pipe offset may occur for instance if in the abutment region of two pipes the position of the abutting pipes is displaced. The opposite and abutting pipe ends then are no longer aligned but are displaced with regard to each other. In the cross-section, at the place of the pipe offset a crack occurs, i.e. the center axes of both pipes are not located on a straight line anymore.

In order to renovate pipe offsets it is known inter alia to use a resin-impregnated glass fiber mat which is placed over an inflatable air cushion or an inflatable packer, respectively. Along with the glass fiber mat, the packer is then positioned at the damaged location in the pipe. Subsequently, the packer is inflated and, in the area of the pipe offset, presses the resin-impregnated glass fiber mat in a force-fit manner to the pipe wall of the abutting pipes. The liquid resin cures over time and bonds the glass fiber mat to the inner wall of the pipes in the area of the pipe offset, i.e. in the area of the damaged location. Due to the slow curing, the packer can only be vented and drawn out of the sewage duct after a few hours. The glass fiber mat then cured remains at the damaged location, seals the pipe offset and forms a step in this place when viewed in cross-section.

However, this known solution has several disadvantages. Due to the resin-impregnated glass fiber mat this must be insulated from the packer by means of a separating agent, so that the glass fiber mat does not stick to the packer. Another disadvantage is that the curing process takes several hours, causing long waiting periods. Various pipe materials cannot be renovated by this method since their material does not bond with synthetic resin or does not form an adhesive connection with synthetic resin, respectively. For an optimum arrangement the bonding surface must be dry, free of dust and grease, which frequently is not guaranteed in a sewage duct to be renovated. Finally, the inlet area of the glass fiber mat becomes frayed in the course of time, namely due to the sewage water flowing through, and in particular also due to the flushing surges for cleaning the pipes. The resulting frayed fringe areas are a flow barrier and in some cases even facilitate a scouring of the glass fiber mat, ultimately resulting in leakages.

Another type of renovating pipe offsets consists in using a stainless steel sleeve which in turn is placed over an inflatable packer or an air cushion, respectively, and subsequently covered by a sealing element made of EPDM. The stainless steel sleeve covered by a sealing element is weakened at least in its central area by means of several holes or openings, respectively, in different configurations in order to ultimately achieve a grid-like structure of at least the central part of the stainless steel sleeve. After positioning the stainless steel sleeve at the damaged location, the sleeve is being expanded and presses the stainless steel sleeve and the sealing element located on top of the stainless steel sleeve to the pipe wall in a force-fit manner. The stainless steel sleeve deforms due to the holes in the central area and thus covers the pipe setoff. Subsequently, the packer can be drawn vented out of the sewage duct, wherein the spanned stainless steel sleeve remains at the damaged location and seals the pipe setoff by means of the sealing element.

This solution also has several disadvantages. Among other things, the air cushion of the packer must be protected with regard to the stainless steel sleeve, since during the inflation of the air cushion this may be damaged by the bars located between the holes. In addition, during the expansion of the stainless steel sleeve thin ridges between the holes give way into the pipe interior and thus form a flow barrier at which paper and other solid matter present in the sewage duct may get caught. At the arrangement location of the stainless steel sleeve the cleaning nozzle, which is inserted into the sewage duct in order to clean it, may entangle and even remove the stainless steel sleeve from the damaged location when drawing out the cleaning nozzle. Depending on the construction, such a sleeve may cover only very small pipe offsets. Finally, if pressure is exerted from the outside onto the damaged location, for instance if the renovated pipe offset is located below groundwater level, the sealing element may be pressed into the pipe interior through the holes in the stainless steel sleeve, since in this area no sufficient supportive effect is present by means of the stainless steel sleeve provided with holes.

SUMMARY OF THE INVENTION

The object of the invention is to provide a sealing inner sleeve and a corresponding method by means of which a successful and satisfactory renovation of pipe offsets can be carried out.

This object is achieved by the subject matters of the independent claims. Preferred embodiments will become apparent from the dependent claims.

The sealing inner sleeve for inserting into pipes according to the invention has two frustoconical or substantially cylindrically bent-round sleeves consisting of steel sheets, wherein the free ends of the steel sheets of the sleeves overlap in their circumferential directions and an arresting device is arranged in each of these overlapping regions and wherein the two sleeves are arranged at a distance from one another in a deformable jacket tube.

Preferably, the two sleeves are bent-round in a frustoconical form and are arranged in such a way that the smaller openings of the sleeves are located opposite of each other.

For this reason, the invention refers to a sealing inner sleeve for inserting into pipes for the purpose of sealing and providing pipe setoffs with a streamlined shape. In this, the sealing inner sleeve consists of two conically or cylindrically bent-round strips of corrosion-resistant steel sheet, whose strip ends overlap in their circumferential directions. The arresting preferably takes place by means of a toothed rack arranged at the internal strip end and a locking mechanism arranged at the external strip end, as is known from DE 195 44 877 C1. The conically bent-round sleeves are inserted into a jacket tube with tip ends arranged towards each other, i.e. with the smaller openings located opposite of each other. The jacket tube is both in case of conically bent-round strips and cylindrically bent-round strips made of a deformable material advantageously having sealing properties, in order to be able to adapt to the shape of the damaged location and achieve the desired sealing at this place.

The jacket tube preferably is cylindrically shaped, by bending or winding, respectively, a rectangular component made for instance of stainless steel or a material having sealing properties, in such a way that it overlaps in circumferential direction. After bending, the jacket tube is supposed to not de-wind in the plane anymore but keep its bent shape. As raw material for the jacket tube also a corrugated material may be used so that after bending, the jacket tube is a corrugated tube. Such a corrugated tube or jacket tube with corrugated configuration, i.e. with a diameter changing along the corrugations, in turn may consist of stainless steel or plastic. The advantage of a corrugated jacket tube lies in an increased elasticity or flexibility, respectively, in order to, after its placement at the damaged location, be able to adapt even better to the interior circumference of the pipe to be repaired since it became more flexible due to its corrugation.

The conical sleeves or draw tubes, respectively, ensure a high pressing effect onto the sealing organ, in this case the jacket tube, at the outer edges of the sleeves. In the center of the sealing inner sleeve a funnel-shaped ramp results on both sides, which also presses the jacket tube to the interior wall of the tube in this area. The originally stepped damaged location, i.e. the pipe offset, thus receives a streamlined structure. The jacket tube is pressed hard to the interior pipe wall as well as sealingly placed at the damaged location by means of the conical sleeves. The ring stiffness of the sleeves prevents a further deformation of the jacket tube towards the interior to the center of the pipe, e.g. by external pressure. In order to be able to adapt the jacket tube to the pipe inner wall at the damaged location, i.e. at the pipe offset, for on the one hand sealing and on the other not reducing the pipe diameter or reducing it to only a small extent, the jacket tube is made of a deformable material, in particular elastic or plastic material.

In order to create a continuous sealing, the jacket tube can preferably be covered by a sealing element. In this case, the jacket tube no longer must have sealing properties, since the sealing element assumes the sealing effect. Subsequently, the jacket tube may even be formed a bit stiffer, as long as it is able to adapt to the damaged location by sufficiently deforming. A preferred material for the jacket tube is for instance PE 1000.

Preferentially, in the area of the two free ends of the jacket tube and/or the sealing element at their outer circumference preferably two pairs of annularly extending sealing ribs are arranged. Such sealing ribs provide for an optimized sealing of the damaged location and prevent liquids from passing both from the pipe to the outside and from the outside into the pipe. In particular, it is not anymore the jacket tube or the sealing element, respectively, in itself which has to have the sealing effect, but mainly the preferably thermoset sealing ribs.

Advantageously, the jacket tube is formed as a wound jacket tube with areas overlapping in circumferential direction of the jacket tube, allowing for a cost-efficient and simple production of the jacket tube.

Suitably, the jacket tube merely covers a part of the two sleeves so that the two sleeves partly protrude out of the jacket tube with their free end areas located in the area of the larger opening of the truncated cone. Correspondingly, in cylindrically bent-round sleeves end areas partly protrude from the jacket tube. Advantageously, by means of the protrusion of the stainless steel sleeves soft components, i.e. in particular the jacket tube and sealing element, of the stainless steel sleeves are protected in the inlet and outlet area of the sleeve by the stainless steel.

Thus, in particular the edge areas at risk can be shielded or protected, respectively, from damages by solid matters in the sewage water and/or high-pressure cleaning nozzles during the cleaning of the sewage duct.

The method for placement of the above described sealing inner sleeve into the pipe according to the invention comprises the steps of:

arranging the sealing inner sleeve on the inflatable air cushion of an offset packer, traversing of the offset packer in the pipe to the damaged location, centrally positioning of the sealing inner sleeve at the damaged location, filling the air cushion for expanding the sealing inner sleeve at the damaged location until the abutment of the sealing inner sleeve at the interior circumference of the pipe, venting of the air cushion and removing the offset packer from the pipe. The sealing inner sleeve is centrally positioned at the damaged location and expanded by means of the inflatable cushion. By means of the conical design of the sleeve and the central arrangement of the sealing inner sleeve at the damaged location, i.e. the pipe offset, during the expansion a positioning of the sealing inner sleeve takes place, which adjusts to both the reduced diameter area at the pipe offset and the diameter of the pipe to be renovated.

BRIEF DESCRIPTION OF THE DRAWINGS

The subject matter of the present invention is described in more detail in the following by means of a preferred embodiment. The following is shown.

DETAILED DESCRIPTION

Figure 1:
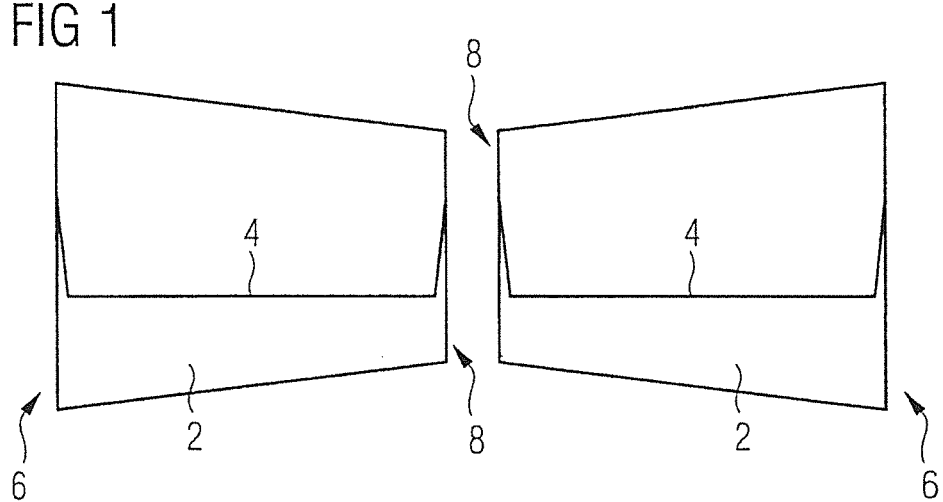
FIG. 1: side view of the sleeves

FIG. 1 shows a view onto the two sleeves 2, which are made of conically bent-round strips made of corrosion-resistant steel sheet, wherein the strip ends 4 of the two sleeves 2 overlap in circumferential direction. Thus, the sleeves 2 have the shape of a truncated cone or funnel, respectively.

Figure 2:
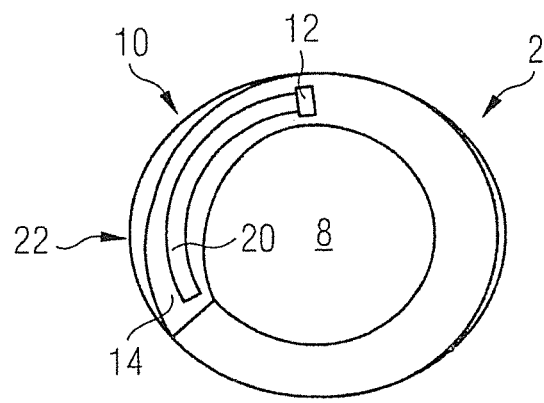
FIG. 2: a view along the longitudinal axis onto a sleeve

FIG. 2 shows a side view onto the sleeve 2 in longitudinal axis direction, onto the larger opening 6 of sleeve 2. By means of the funnel-shaped or frustoconical design, respectively, of sleeve 2, in FIG. 2 also the rear, smaller opening 8 is shown. In the overlapping area 10 of sleeve 2 an arresting device 12 is shown. The arresting device 12 is again shown in more detail in subsequent FIG. 3, and allows for very small latching steps. To this aim, a slot 20 provided with two rows of teeth 16, 18 (FIG. 3) is arranged at the internal strip end 14. At the external strip end 22 a locking mechanism 24 which is not described in more detail is arranged, wherein the corresponding arresting device 12 is described in more detail in DE 195 44 877 C1.

Figure 3:
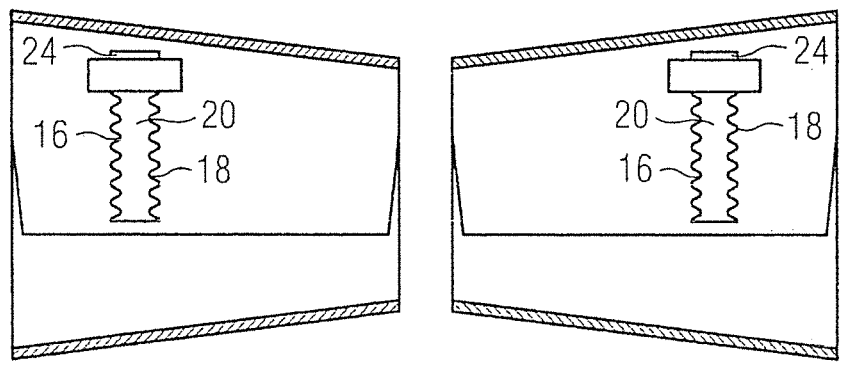
FIG. 3: a side view corresponding to FIG. 1 with representation of the arresting device

FIG. 3 shows in a side view the arrangement of the arresting device 12 at sleeves 2.

It shall be remarked in this place that the dimensions of sleeves 2 are adjusted to the corresponding diameters of the pipes to be renovated. As a rule, it is possible to renovate pipes with an interior diameter of approx. 150-180 mm with the sealing inner sleeve according to the invention. The corresponding pipes are provided with fixed diameters standardized according to DIN, with regard to which the corresponding dimensions of the sealing inner sleeve according to the invention and thus the sleeves 2 are designed.

As mentioned above, the arresting of sleeves 2 takes place via a toothed rack (consisting of the rows of teeth 16 and 18) arranged at the internal strip end 14 and a lock or locking mechanism 24, respectively, arranged at the external strip end.

Figure 4:
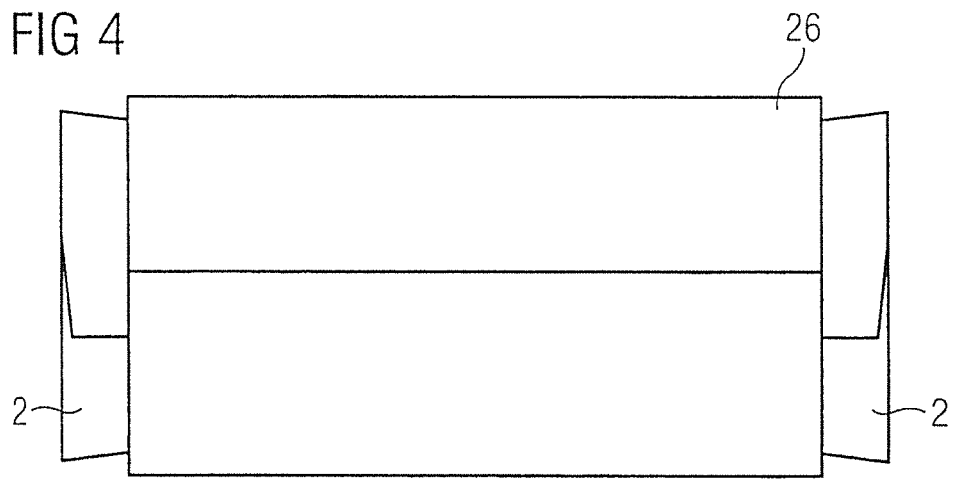
FIG. 4: a side view onto the sealing inner sleeve

FIG. 4 in turn shows in a side view the sealing inner sleeve with the arrangement of both sleeves 2 within a jacket tube 26. In order to arrange sleeves 2 in the jacket tube 26, the conically bent-round sleeves are inserted into the jacket tube 26 overlapping in circumferential direction with their small openings opposite in the pipe interior. As is also discernible from the subsequent FIG. 6, the sleeves 2 protrude with their free ends from the jacket tube. The protruding free ends of sleeve 2 are the areas in which sleeves 2 have the larger opening 6.

Figure 5:
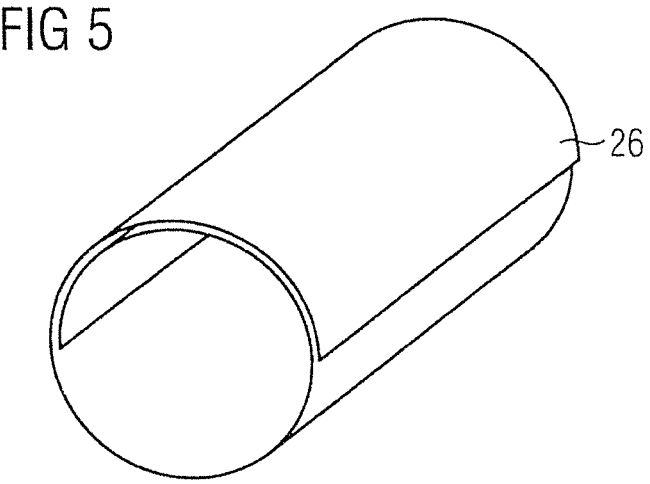
FIG. 5: a perspective view of the jacket tube

FIG. 5 shows in a perspective view the jacket tube 26 wound in an overlapping manner in circumferential direction, without the sleeves 2 arranged in the jacket tube as they are shown in FIG. 4.

Figure 6:
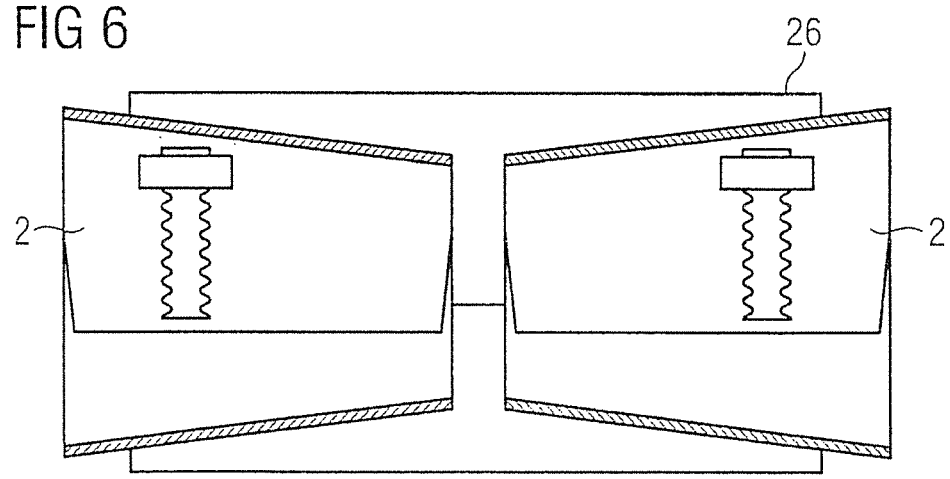
FIG. 6: a cross-section of the sealing inner sleeve with the sleeves arranged in its interior

FIG. 6 shows the sealing inner sleeve with the two sleeves 2 as they are arranged in the jacket tube 26, in a half section. In it, the representation in FIG. 6 corresponds to the representation in FIG. 3, with in FIG. 3 merely the jacket tube 26 not being shown.

Figure 7:
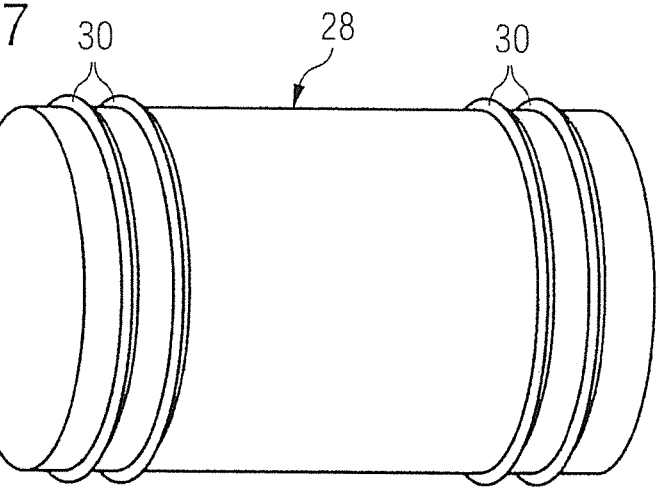
FIG. 7: a perspective view of the sealing element

FIG. 7 shows in a perspective view a sealing element 28, which is placed over the jacket tube 26 not shown in this figure in order to create a continuous sealing, so that jacket tube 26 (shown in the subsequent FIG. 8) is covered by the sealing element 28. In this, the sealing element 28 has two pairs of sealing ribs 30 at the outer circumference in the area of the two free ends, the sealing ribs extending annularly around the circumference of the sealing element 28 or annularly circulating the sealing element 28, respectively. The sealing ribs 30 formed circumferentially annularly reliably seal the damaged location in order to prevent liquids from passing both from the pipe to the outside and from the outside into the pipe.

Figure 8:
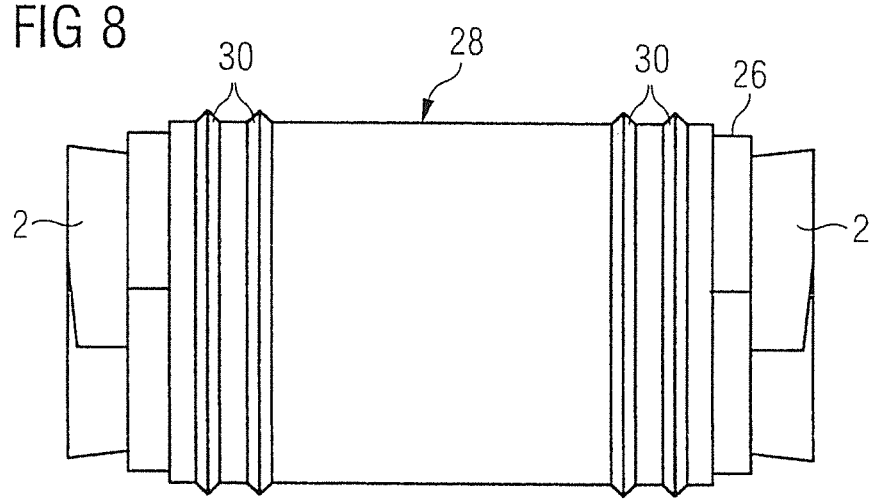
FIG. 8: a side view onto the sealing inner sleeve with sealing element arranged above the jacket tube

FIG. 8 shows in a side view a complete sealing inner sleeve consisting of the two sleeves 2 inserted into the jacket tube 26 and the sealing element 28, which is placed over the jacket tube 26 wound in an overlapping manner in the circumferential direction. In FIG. 8 also the pairs of sealing ribs 30 protrude or project from the circumferential surface of sealing element 28, respectively.

Figure 9:
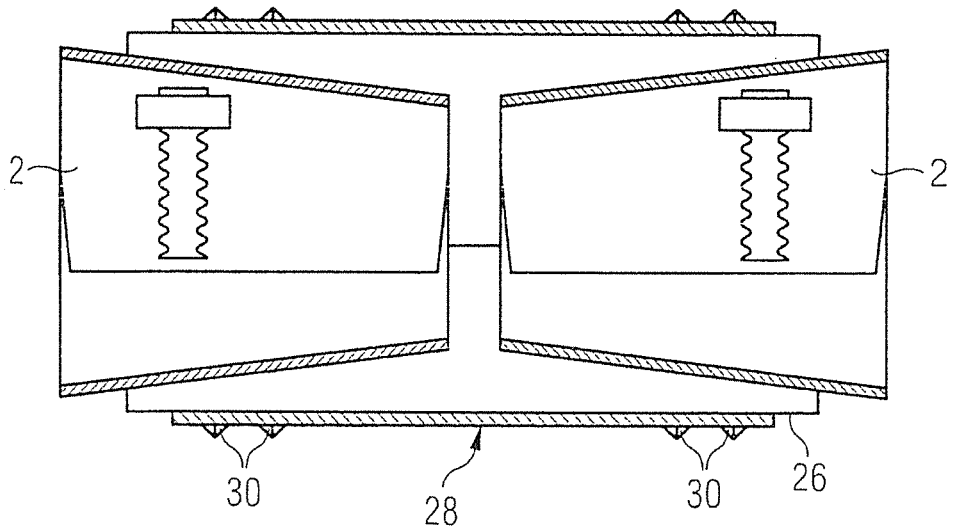
FIG. 9: a cross-section of the sealing inner sleeve with the sleeves arranged in its interior as well as sealing element arranged above the jacket tube

FIG. 9 corresponds to the representation of the sealing inner sleeve according to FIGS. 3 and 6, however with sealing element 28 placed over the jacket tube 26.

By means of the subsequent FIGS. 10-16 the placement of the sealing inner sleeve into the interior of a pipe 32 is illustrated.

Figure 10:
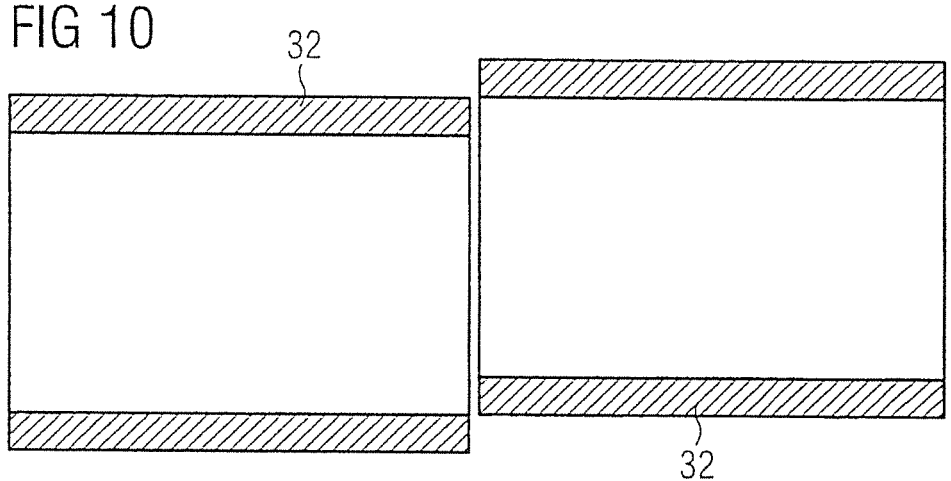
FIG. 10-16: representation of the insertion of the sealing inner sleeve for repairing a pipe offset

FIG. 10 shows the damage picture of a pipe offset of pipe 32. Such a pipe offset may result from a bursting of the pipe or a displacement in the abutment or sleeve region, respectively, of two abutting pipes. It is essential for a pipe offset that the pipe axes are not located on a straight line anymore in the area of the damaged location but are offset from each other.

Figure 11:
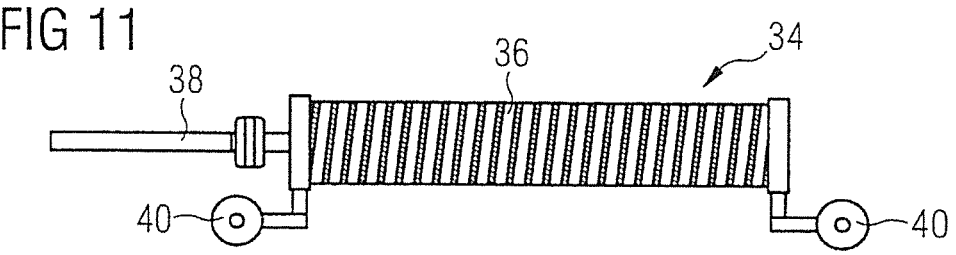

FIG. 11 shows an offset packer 34 known per se with inflatable air cushion 36. The offset packer 34 has, among other things, a feed 38 which provides the offset packer 34 inter alia with compressed air for inflating the air cushion 36 as well as with electrical signals for instance for a camera. The offset packer 34 is provided with wheels 40 in order to enable the offset packer 34 to drive into the interior of a pipe. In particular, in order to enable or simplify, respectively, the desired positioning of the offset packer 34 inside the pipe. The feed 38 an also be designed as an air tube or a slide rod.

Figure 12:
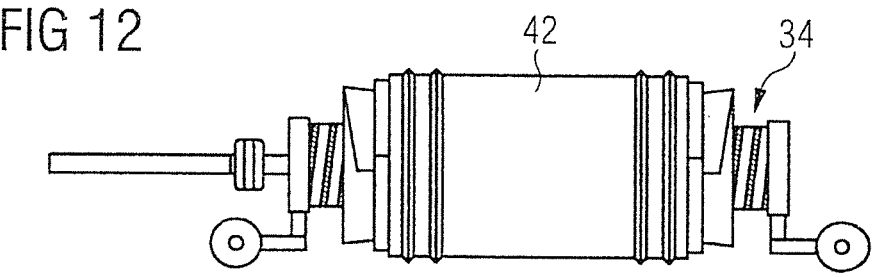

In FIG. 12 it is shown how the sealing inner sleeve 42 according to the invention is arranged on the offset packer.

Figure 13:
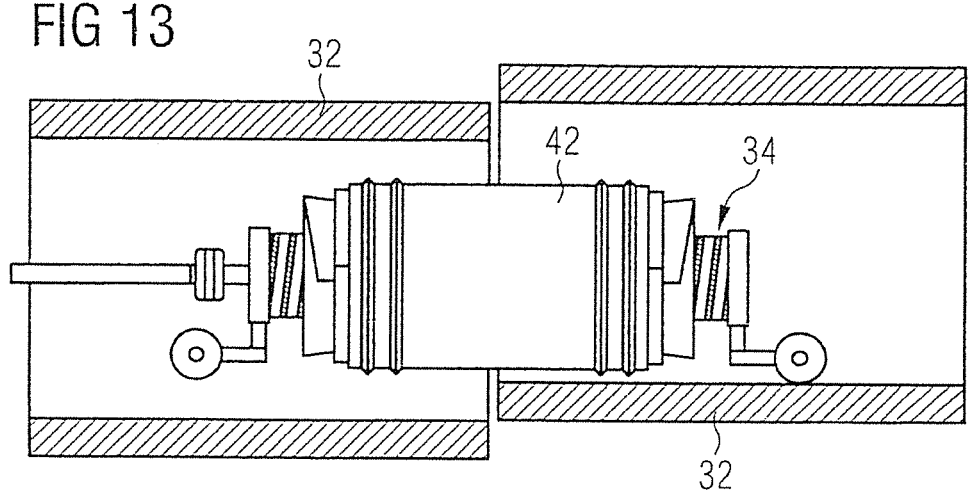

FIG. 13 shows how the offset packer 34 with the sealing inner sleeve 42 is positioned centrally in the area of the damaged location, in this case the pipe offset, in the interior of the pipe 34.

Figure 14:
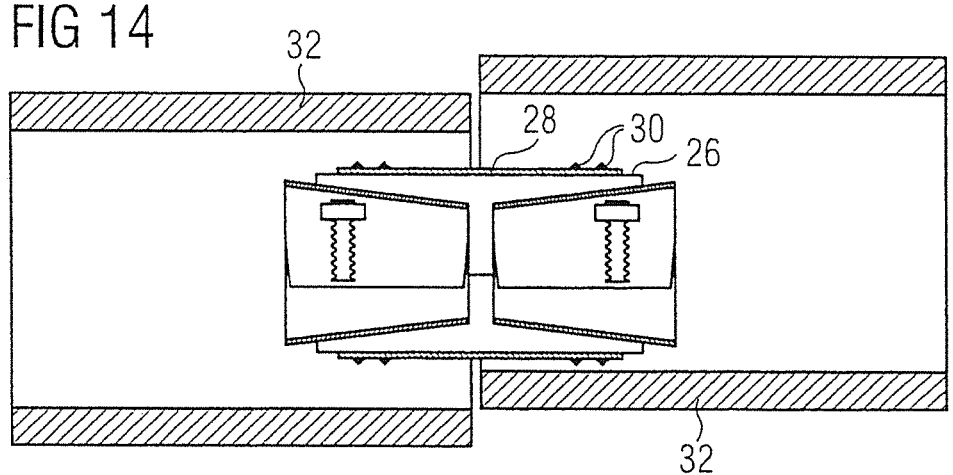

FIG. 14 shows in a half section, without representation of the offset packer, the components of the sealing inner sleeve 42, i.e. the two sleeves 2, the jacket tube 26 as well as the sealing element 28 with the four sealing ribs 30.

Figure 15:
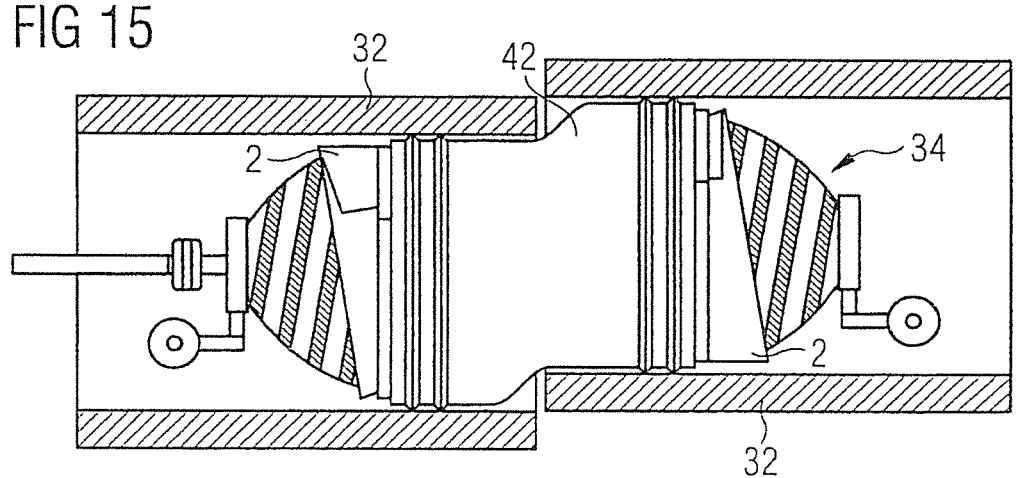

FIG. 15 shows the offset packer 34 with inflated air cushion 36, which causes an expansion of the sealing inner sleeve 42 or the two sleeves 2, respectively. In doing so, the air cushion 36 is inflated until the outer circumferential surface of the sealing element 28 and thus also of the sealing ribs 30 closely abut to the inner wall of the pipe 34. By means of the conical shape of sleeves 2 and a kind of vibrating mounting of sleeves 2 in the jacket tube 26 an optimized positioning of the sleeves 2 takes place during the expanding of the sleeves 2, which adjusts to both the reduced diameter area at the pipe offset and the diameter of the packer 34.

Figure 16:
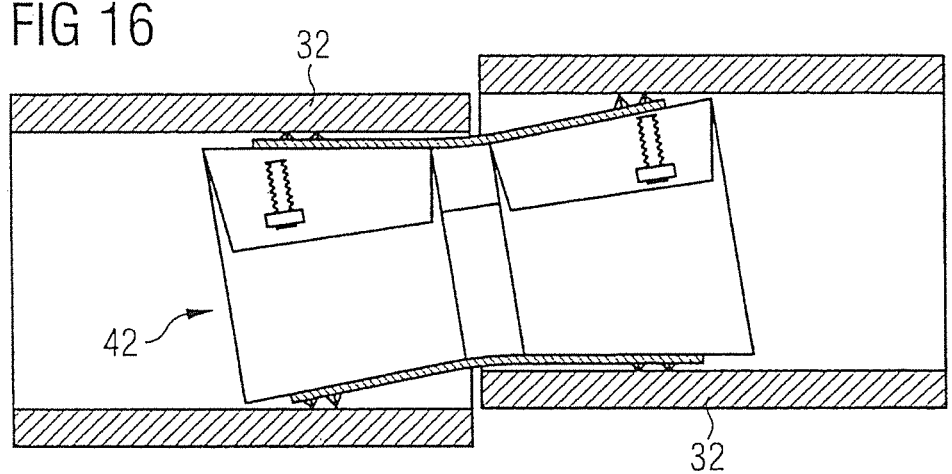

FIG. 16 now shows the final position of the sealing inner sleeve 42 in half section without the offset packer, which in the meantime has been removed by means of venting the air cushion and drawing the offset packer out of the pipe 32. The sealing inner sleeve 42 remaining in the pipe at the damaged location remains there and permanently seals the damaged location in the area of the pipe offset. By means of the interior configuration of the sleeves 2 and the jacket tube 26 a streamlined course is created in the area of the pipe offset. In this, it is essential that the sleeves 2 in the interior of the jacket tube 26 are arranged at a distance from one another. Due to the distance of sleeves 2 from another it is possible that the jacket tube 26 as well as the sealing element 28 located on the jacket tube can closely abut to the wall of the corresponding parts of the pipe in the interior of pipe 32.

Figure 17:
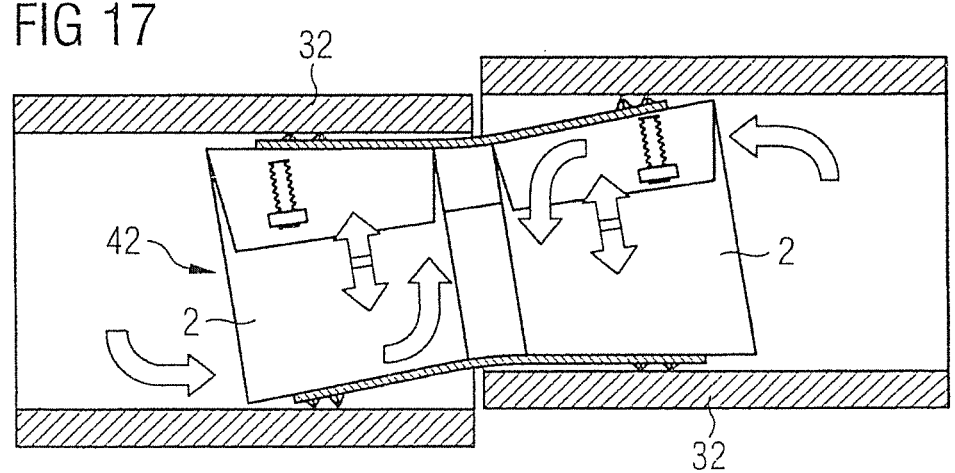
FIG. 17: representation of the distribution of forces with placed sealing inner sleeve

FIG. 17 shows in a kind of half section the final position of sleeves 2 of the sealing inner sleeve 42 after its placement and the distribution of forces in the area of sleeves 2.

Due to the possibility of the sleeves 2 being able to move relatively to the jacket tube 26 inside of the jacket tube 26, the sleeves 2 slide into an optimum position inside of the jacket tube 26. In doing so, the damaged location, in this case the pipe offset, serves as forced guide for sleeves 2 in order to position these in the correct position. The left sleeve 2 shown in FIG. 17 then takes a final position in such a way that, seen in a cross-section, it extends more or less in parallel to the pipe inner wall in the upper area. In contrast, in the lower area the left sleeve 2, again seen in a cross-section, forms a ramp in order to bridge the offset between the two pipes. In FIG. 17, in the right sleeve 2 the opposite is the case. Seen in a cross-section, the lower area of the right sleeve 2 in turn extends in parallel to the pipe inner wall, whereas the upper area of sleeve 2, again seen in a cross-section, forms a ramp in order to bridge the offset between the two pipes. So the two sleeves 2 ideally abut to the pipe inner walls in the area of the damaged location in order to provide for an optimum flow cross-section in the area of the interior of the sealing inner sleeve in this way.

Due to the arresting device 12 via the toothed rack arranged at the internal strip end or the tooth racks of the two sleeves 2 and the locking mechanisms arranged at the external strip ends it is guaranteed that the sealing inner sleeve 42 safely remains in its final position, even after the offset packer has been removed.

As already mentioned, the pair of sealing ribs are pressed to the pipe inner wall and guarantee a permanent sealing in the area of the damaged location. The high ring stiffness of the sleeves 2 ensures a permanent invariable positioning of the entire sealing inner sleeve 42 in the interior of the pipe 32 in the area of the damaged location. The interior stiffness also ensures that a buckling of sleeves 2 and thus the sealing inner sleeve 42 is prevented with a possibly present external pressure.

Figure 18:
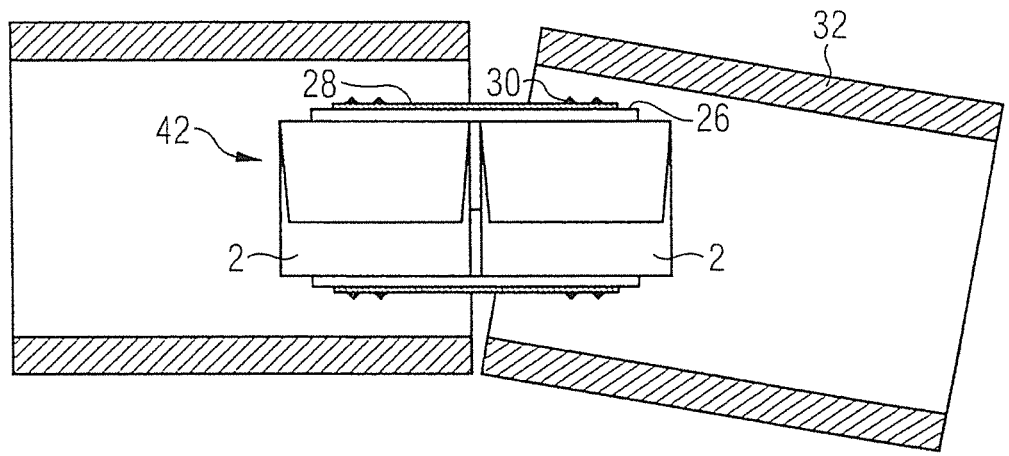
FIG. 18: a schematic representation of an embodiment of the sealing inner sleeve in a pipe

FIG. 18 shows an embodiment of the sealing inner sleeve 42 with two cylindrical sleeves 2. The sealing inner sleeve 42 has been inserted into a pipe 32, however not been transferred into its final position of use. Analogously to the above remarks, the sealing inner sleeve 42 comprises two sleeves 2, which, however, are shaped cylindrically and not conically. The sleeves 2 are arranged inside of a jacket tube 26, wherein in each case an end area of each sleeve 2 protrudes out of the jacket tube 26. The jacket tube 26 is covered at least in part by a sealing element 28. The sealing ribs 30 are arranged at the sealing element 28. The above remarks with regard to FIGS. 1 to 17 regarding the embodiment with conically bent-round, i.e. frustoconical sleeves 2 apply analogously to the embodiment with essentially cylindrical sleeves 2 according to FIGS. 18 and 19.

In particular, sleeves 2 can also each have an arresting device, which, however, are not shown in FIG. 18.

Figure 19:
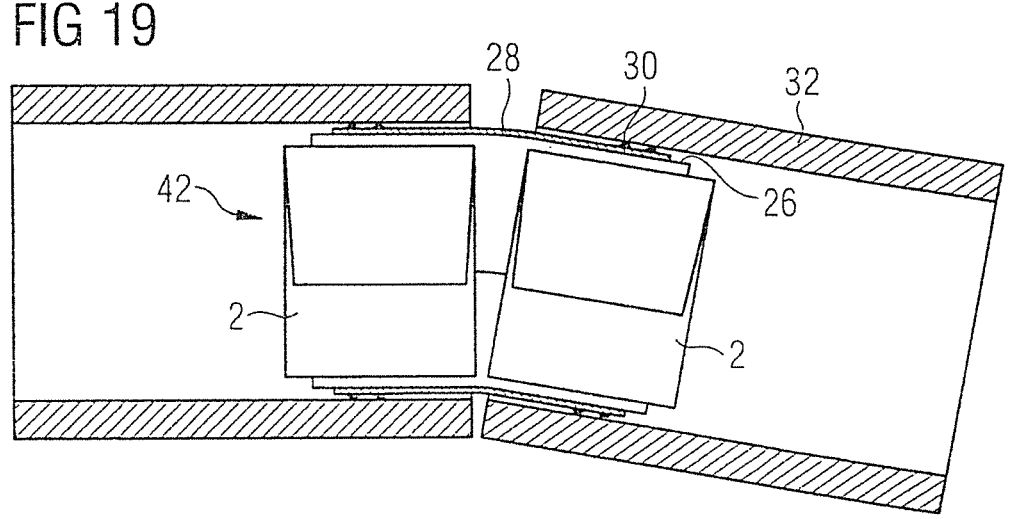
FIG. 19: a schematic representation of an embodiment of the sealing inner sleeve in a pipe

FIG. 19 shows the sealing inner sleeve 42 with cylindrical sleeves 2 according to FIG. 19 in its position of use, in particular when using the sealing inner sleeve 42 for repairing a pipe offset. Identical components or subject matters, respectively, were labelled with the same reference signs.

LIST OF REFERENCES 2 sleeve
4 strip end
6 large opening
8 small opening
10 overlapping area
12 arresting device
14 internal strip end
16 row of teeth
18 row of teeth
20 slot
22 external strip end
24 locking mechanism
26 jacket tube
28 sealing element
30 sealing rib
32 pipe
34 offset packer
36 air cushion
38 feed
40 wheel
42 sealing inner sleeve

What is claimed is:

1. Sealing inner sleeve for inserting into axially offset pipes, comprising:
    two bent-round sleeves formed of steel sheets, said bent-round sleeves having inner and outer surfaces and being frustoconical in the form of a truncated cone which is frustoconical on the inner surface and frustoconical on the outer surface and are arranged in such a way that smaller openings of the two sleeves are located opposite of each other,
    the two sleeves being unconnected with each other,
    wherein the steel sheets of the sleeves include free ends that overlap in overlapping areas in circumferential directions thereof,
    an arresting device arranged in each of these overlapping areas which permits expansion of the sleeves to an expanded configuration and which retains the sleeves in the expanded configuration, and
    a deformable jacket tube in which the two sleeves are arranged at a distance from one another, the jacket tube being formed as a wound jacket tube with areas overlapping in the circumferential direction of the jacket tube and being in direct contact with the sleeves when expanded,
    a tubular sealing element covering the jacket tube, and
    annularly extending sealing ribs arranged in an area of opposite free ends at an outer circumference of the tubular sealing element.

2. Sealing inner sleeve according to claim 1, wherein the jacket tube covers a part of the two sleeves so that the two sleeves partly protrude out of the jacket tube with outer free end areas thereof located in an area of a larger opening of the truncated cone.

3. Method for placement of the sealing inner sleeve according to claim 1 into a pipe, comprising the following steps:
    arranging the sealing inner sleeve on an inflatable air cushion of an offset packer,
    traversing the offset packer in a pipe to a damaged location thereof,
    centrally positioning the sealing inner sleeve at the damaged location,
    filling the air cushion for expanding the sealing inner sleeve at the damaged location until abutment of the sealing inner sleeve at an interior circumference of the pipe, and
    venting of the air cushion and removing the offset packer from the pipe.

* * * * *